United States Patent [19]

Gorges

[11] Patent Number: 4,790,421
[45] Date of Patent: Dec. 13, 1988

[54] ROLLER ASSEMBLY

[75] Inventor: Frederick J. Gorges, Bellevue, Wash.

[73] Assignee: The Boeing Company, Seattle, Wash.

[21] Appl. No.: 111,983

[22] Filed: Oct. 22, 1987

[51] Int. Cl.$^4$ .................................. B65G 13/00
[52] U.S. Cl. ....................... 193/37; 198/780; 384/537
[58] Field of Search ............... 193/37; 198/780; 384/569, 537, 906

[56] References Cited

U.S. PATENT DOCUMENTS

| 1,300,590 | 4/1919 | Donald | 384/569 |
|---|---|---|---|
| 1,893,574 | 1/1933 | Anderson | 384/906 X |
| 2,886,156 | 5/1959 | Halbron | 193/37 |
| 3,246,216 | 4/1966 | Mead et al. | 193/37 |
| 3,255,858 | 6/1966 | Reilly | 193/37 |
| 3,416,638 | 12/1968 | Buck | 193/37 X |
| 3,599,769 | 8/1971 | Gardella | 193/37 X |
| 3,610,387 | 10/1971 | Vom Stein | 193/37 |
| 3,669,243 | 6/1972 | Fischbacher | 193/37 X |
| 3,779,356 | 12/1973 | Jorgenso | 193/37 |
| 3,841,721 | 10/1974 | Coutant et al. | 193/37 X |
| 3,866,716 | 2/1975 | Matson | 193/37 X |
| 3,894,323 | 7/1975 | Hamlen | 198/842 X |
| 3,899,063 | 8/1975 | Pollard | 193/37 X |
| 3,934,951 | 1/1976 | Stumpf | 193/37 X |
| 3,944,055 | 3/1976 | Stumpf | 198/780 X |
| 3,957,147 | 5/1976 | Specht | 193/37 |
| 4,059,180 | 11/1977 | Krivec et al. | 193/37 |
| 4,213,523 | 7/1980 | Frost et al. | 193/37 |
| 4,441,601 | 4/1984 | Rood | 193/37 |
| 4,577,747 | 3/1986 | Martin | 198/780 X |

Primary Examiner—Robert J. Spar
Assistant Examiner—Cheryl L. Gastineau
Attorney, Agent, or Firm—Hughes, Cassidy & Multer

[57] ABSTRACT

A roller assembly to be used to support cargo which is being moved over a floor surface. The assembly comprises an elongate horizontally disposed mounting member with roller units mounted thereto. Each roller unit comprises an outer roller member, two support bearings, two locating elements, a center shaft, and an end nut. Each locating element has cylindrical portions surrounding the shaft and butting against one another.

19 Claims, 2 Drawing Sheets

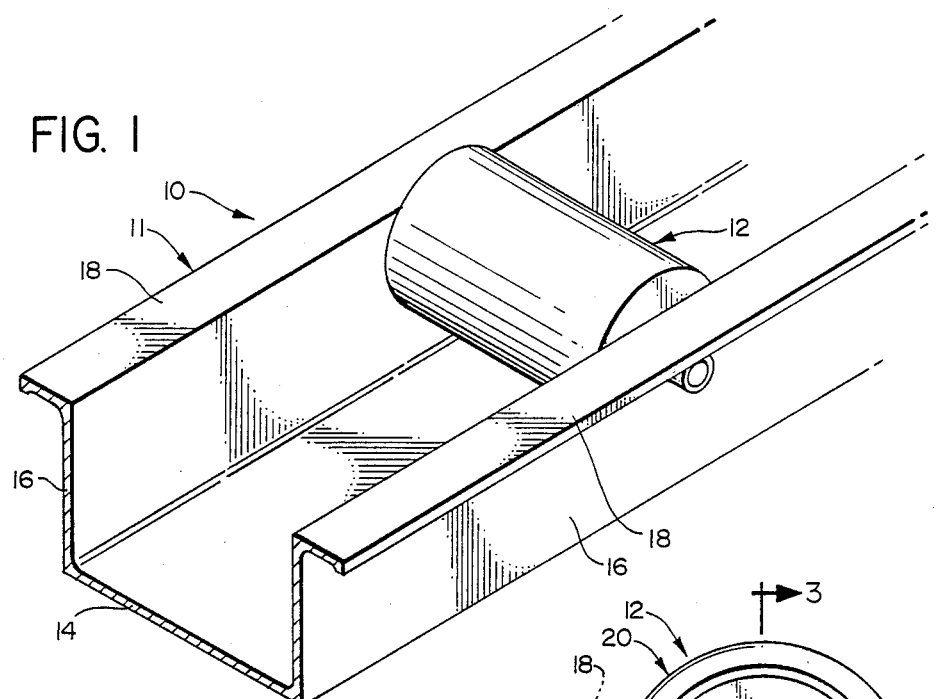
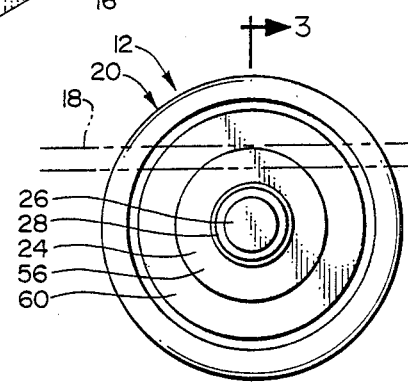
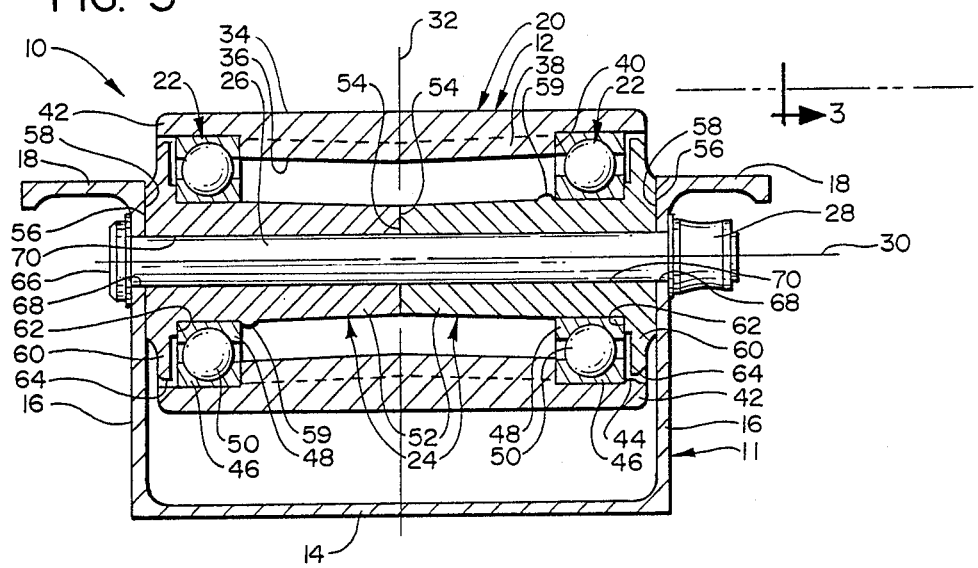

4,790,421

ROLLER ASSEMBLY

FIELD OF THE INVENTION

The present invention relates to roller assemblies, and more particularly to such roller assemblies which are adapted to support cargo which is being moved over a floor surface, such as the floor of a cargo area of an aircraft.

BACKGROUND OF THE INVENTION

One method of moving and/or loading cargo is to provide a supporting surface, such as a floor, with a plurality of rollers on which the cargo can be supported and conveniently moved to a desired location for shipment or storage. Some of these rollers are ball type rollers which enable multi-directional movement over the rollers, while others are generally cylindrical type rollers which provide for uni-directional movement.

Such roller transport systems have been found to be quite effective for use in aircraft, where quick and convenient loading and unloading must be accomplished. As with any equipment which is carried on an aircraft, in additional to being able to perform its basic functions, such equipment must be made to be both sturdy and lightweight. Of course, as with any manufactured equipment, it is desirable that it can be manufactured and used economically, and also lend itself to convenient and trouble free operation.

A search of the patent literature has disclosed a number of roller type devices, these are as follows:

U.S. Pat. No. 2,886,156—Halbrown shows a roller for a conveyor where the outer roller member or casing is bonded to end hub members which are in turn mounted to a shaft. Bearing members are mounted in outer recesses in the hub members. Also, there are end closure members. A different configuration is shown in FIG. 7, where the bearing is positioned inwardly between two half sections which form the hub member.

U.S. Pat. No. 3,246,216—Mead et al shows what is called a "Duel-Roller Probe for Moisture Content Meter". This shows an outer cylindrical member mounted by bearings to a shaft.

U.S. Pat. No. 3,255,858—Reilly shows a roller construction where there is an outer cylindrical sleeve which is bonded to two end members 43 which in turn interfit with an inner sleeve 33. The sleeve 33 is supported by radial bearings which are arranged to also withstand axial loading. There is a center shaft which supports the bearings, and there are end members 18 and 19 which are threaded onto opposite portions of the shaft.

U.S. Pat. No. 3,416,638—Buck shows a carrier roller for belt conveyors which is designed to be corrosion resistant. There is an outer rotor element 16 made up of two identical half rolls 18 which are joined together. The ends of each roller extend radially inwardly and have a wall portion which is supported by bearings that are in turn supported by a shaft 42. There are end seal members 80 mounted to the ends of the shaft. The wall 32 has an inwardly extending flange (see FIG. 8) which would appear to take axial loads exerted on the roller and pass these to the bearings.

U.S. Pat. No. 3,599,769—Gardella shows a "roller conveyor" comprising two parallel side rails and a plurality of rollers. A tube 2 is mounted concentrically with a shaft 3 through bearing members mounted to an inner stationary race 6.

U.S. Pat. No. 3,610,387—Stein discloses a roller for roller conveyors where the outer roller element is mounted by bearings to a shaft. There are seals mounted outside of the bearings.

U.S. Pat. No. 3,669,243—Schaffhausen discloses a conveyer roll where the roller member is mounted by bearings to a shaft, with the shaft being mounted to side support members.

U.S. Pat. No. 3,779,356—Jorgensen shows a roller where several roller sections are adapted to be fitted together to make a roller of greater or lesser length.

U.S. Pat. No. 3,841,721—Coutant et al shows a particular type of a bearing cartridge assembly for a roller.

U.S. Pat. No. 3,866,716—Matson shows a roller which receives a lubricant and has in the interior of the roller a sponge like material which assists in the distribution of the lubricant.

U.S. Pat. No. 3,894,323—Hamlen shows a roller for a belt conveyor where there is a heat dissipating means imbedded in the plastic roller to touch the bearing and transfer heat from the bearing to outside the roller.

U.S. Pat. No. 3,934,951—Stumph shows a system of construction components from which roller assemblies for a roller train can be produced.

U.S. Pat. No. 3,957,147—Specht shows a roller for a conveyor apparatus showing a roller provided with a dust cover designed to limit the entrance of water into the roller casing.

U.S. Pat. No. 4,213,523—Frost et al shows a roller assembly where the rollers have end bearing inserts made of a polymeric plastic. The rollers are particularly adapted for use in sanitary applications, such as food processing and the like.

U.S. Pat. No. 4,441,601—Rood shows another type of roller assembly also having end inserts of a plastic or similar material, this also being adapted for use in sanitary applications.

French Pat. No. 1,099,897 shows what appears to be a roller where the roller element is supported to a shaft by end bearings, and locating or spacing elements positioned within the outer roller member and between the bearing members.

It is an object of the present invention to provide a roller assembly for moving cargo or the like, where the roller assembly has a desirable blend of characteristics regarding economy and effectiveness of use and manufacture, and where the components are arranged so that the loads are transmitted into the support structure in a manner that the components can be provided to optimize economy of manufacture, use and assembly.

SUMMARY OF THE INVENTION

The roller assembly of the present invention comprises a mounting structure having two laterally spaced mounting members. There is a shaft having a longitudinal axis, first and second end portions, and a middle portion. The end portions of the shaft are adapted to be mounted to the mounting members.

There are first and second locating members, each comprising a main mounting portion adapted to be mounted to and positioned around said shaft, and an end spacing portion. First and second bearing members, adapted to take primarily radial loads, are adapted to be positioned adjacent to and axially inwardly from the end spacing portions of the first and second locating members, respectively, and positioned around and supported from the main mounting portions of the locating members.

A roller member is adapted to be positioned around the shaft and bearing members and supported by the bearing members.

The assembly is characterized in that in an assembled position the roller member is in operative engagement with the spacing portions and is in direct load bearing relationship with the bearing members in a manner that while radial loads are transmitted from said roller member into said bearing members, axial loads on the roller member are transmitted into the locating members and to the mounting structure.

In the preferred form, end portions of the roller member are directly connected to the spacing portions of the locating members, and the spacing portions are adapted to be in engagement with the mounting structure.

The main mounting portions of the locating members have axially inwardly located end portions which engage one another so as to locate the locating members relative to one another on the shaft. The mounting members firmly engage the locating members to press the locating members against one another.

In the preferred form, the bearing members each have inner and out bearing races, and the spacing portions engage axially outward portions of the inner races so as to locate the inner races, and the mounting portions of the locating members have locating means to engage axially inward portions of the inner races.

Desirably, the roller member has inwardly protruding longitudinally extending reinforcing ribs which extend along the longitudinal axis. These reinforcing ribs, in addition to serving a reinforcing function relative to the roller, are arranged to engage and locate the outer races. The roller member has end retaining portions adapted to engage axially outward portions of the outer races so as to locate the outer races.

The present invention also comprises a roller unit adapted to be mounted in an assembly as described above.

Other features of the present invention will become apparent from the following detailed description.

BRIEF DESCRIPTION OF THE DRAWINGS

FIG. 1 is an isometric view showing the roller assembly of the present invention;

FIG. 2 is a side elevational view of one of the rollers in the roller assembly, with a side mounting structure being shown in broken lines;

FIG. 3 is a sectional view taken along line 3—3 of FIG. 2, illustrating one of the roller elements of the present invention;

DESCRIPTION OF THE PREFERRED EMBODIMENT

Figure 4:
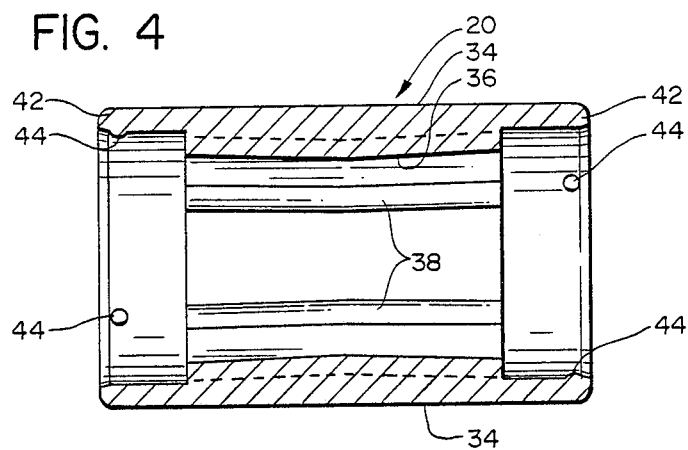
FIG. 4 is a sectional view of the outer roller member of the present invention, with the section being taken along the axial center line of the roller.
Figure 5:
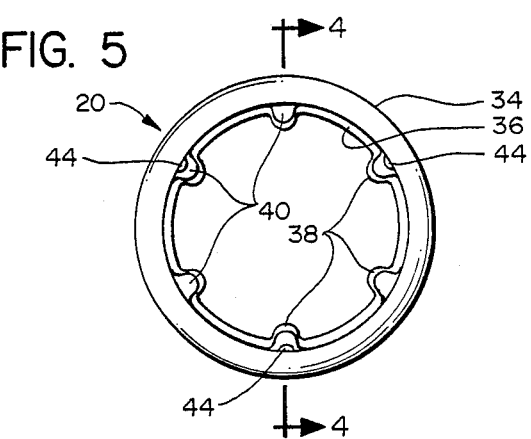
FIG. 5 is an end view of FIG. 4.

With reference to FIG. 1, there is shown a portion of a roller assembly 10 comprising an elongate horizontally disposed mounting member 11 having a plurality of roller units 12 mounted thereto. As shown herein, the mounting member 11 has in cross section a generally channel like configuration, comprising a base plate 14 and two upstanding side plates 16, the upper ends of which have outwardly and laterally extending flanges 18.

With reference to FIG. 3, there is shown one of the roller units 12, with each roller unit 12 being made up of the following: an outer roller member 20, two bearings 22, two locating elements 24, a center shaft 26, and an end nut 28. The shaft 26 has a longitudinal center axis 30. In describing the roller unit 12, the term "radially inward" will denote proximity to, or a direction toward, the longitudinal center axis 30, while the term "radially outward" will denote a location further from, or a direction away from, the longitudinal axis 30. The term "axially inward" will denote proximity to a plane 32 which is transverse to the longitudinal axis 30 and centered relative to the shaft 26, while the term "axially outward" will denote a location further from the plane 32 or a direction extending away from the plane 32.

The roller member 20 has a generally cylindrical configuration and comprises an outer cylindrical contact surface 34 which supports the cargo and an inner surface 36. The thickness dimension between the outer and inner surfaces 34 and 36 increases moderately toward the axial center of the roller 20 for added strength in that area, so that the inner surface 36 tapers radially inwardly a slight amount toward the center plane 32. Further, the axial center portion of the roller 20 (i.e., that portion closer to the center plane 32) has a slightly greater diameter than the end portions of the roller 20 so as to take most of the loading. The roller 20 is made to be moderately resilient to take shock loads. Further, the inner surface 36 is formed with a plurality of longitudinally extending and inwardly protruding reinforcing ribs 38 positioned at evenly spaced intervals and having end faces 40 that also have a locating function relative to the bearing 22. The outer end portions 42 of the roller 20 extend moderately beyond the axially outward surfaces of the bearings 22 and are provided with radially inwardly extending protrusions (one of which is shown at 44) to assist in locating the roller member 20 relative to the bearing 22.

Each bearing 22 comprises an outer race 46, an inner race 48, and bearing members (e.g., ball bearings or roller bearings) which are indicated somewhat schematically at 50. The bearings 22 are, or may be, in and of themselves conventional, and these are characterized in that they are designed to withstand primarily radial loading, as opposed to more expensive bearings which are designed to resist both radial and axial thrust loads. As will be explained more fully later herein, the arrangement of the components of the roller units 20 are such as to enable this type of bearing 22, which is relatively inexpensive, to be used effectively.

Each locating element 24 comprises a main mounting portion 52 having a cylindrical configuration and fitting around and engaging the shaft 26. The axially inward transverse surfaces 54 of the main mounting portions 52 butt against one another at the location of the center transverse plane 32, while the axially outward surfaces 56 of the two main mounting portions 52 butt against inside surfaces 58 of the side mounting plates.

The radially outward surface of the two mounting portions 52 are formed with small radially outwardly extending protrusions 59 at evenly spaced locations around the circumference thereof immediately adjacent to, and axially inwardly of, the inner races 48 of the bearings 22, so that the inner races 48 are properly located.

Each locating element 24 also comprises an axially outward positioned end portion 60 which has a generally planar circular disk like configuration. The radially inward portion 62 of the end portion 60 projects axially inwardly a short distance to form an annular surface which bears against the inner race 48. The outer circumferential edge 64 of the end portion 60 is bonded or otherwise joined to the inner surface of the outer end portions of the roller member 20, and this can conveniently be done by bonding at spaced locations around the circumferential edge 64. Thus, axial loads on the roller 20 (i.e., loads directed parallel to the longitudinal axis 30) are reacted from the roller 20 into the locating member end portions 60 and into the sidewalls 16 of the mounting member 11.

The shaft 26 is of itself of conventional design and has a cylindrical configuration with an end head 66 which is positioned axially outwardly of one of the sidewalls 16 and bears against the outer surface of that sidewall 16. Suitable cylindrical openings 68 are formed in the sidewalls 16 to receive the shaft 26. The nut 28 is positioned axially outwardly of the other sidewall 16 and is threaded onto the end of the shaft 26 so as to bear against the other sidewall 16.

To describe the assembling of the present invention, the bearings 22 are positioned within the ends of the roller member 20, and the two locating elements 24 are positioned as shown in FIG. 3. Then these components 20-24 are placed within the mounting member 11 and the shaft 26 inserted through the openings 26 and through the openings 70 defined by the two locating elements 24. Then the nut 28 is threaded onto the end of the shaft 26. Other roller units 12 are similarly mounted to the mounting member 11, and a plurality of such mounting members 11 are generally placed at a floor location to provide a conveying surface for the cargo.

To describe the operation of the present invention, reference is made to FIG. 3. It can be seen that a vertical load placed on the upwardly exposed surface portion of the exterior surface 34 of the roller 20 results in a vertical load being placed on the bearings 22, with the bearings 22 in turn transmitting such loads into the adjacent portions of the main mounting portions 52 of the locating elements 24, into the shaft 26 and to the mounting member 11. The outer bearing races 46 are positioned by the ribs 40 and the protrusions 44 on the roller 20. The inner bearing races 48 are positioned by the radially inward portion 62 of the locating element end portions 60 and by the protrusions 59.

The locating elements 24 are made so that these fit against the inner surfaces 58 of the mounting plates 16, and by tightening the nut 28, the side plates 16 are pressed against the axially outward surfaces 56 of the locating elements 24. The effect of this is that the mounting member 11, the shaft 26 and the locating elements 24 are fixedly held against one another so as to have the effect of forming a unitary structure.

If there is any axial loading on the roller 20 (e.g., resulting from a force having a component parallel to the longitudinal axis 30), this will be transmitted from the roller element 20 to the locating element end portions 60 (to which it is connected) and into the side plates 16. Thus, the bearings 22 are substantially isolated from any axial loading. As indicated previously, this simplifies the design in that less expensive bearings, designed primarily to take radially loads, can be used. In addition, since these bearings 22 are positioned around the mounting portions 52, and since these mounting portions 52 have a greater diameter than the shaft 26, there is overall greater bearing surface on which the bearings 22 can act so that the unit area loading on the bearings is decreased, in comparison with an arrangement where the bearings 22 would act directly on the shaft 26.

It is to be understood that various modifications could be made to the present invention without departing from the basic teachings thereof.

What is claimed is:

1. A roller assembly comprising:
   a. a mounting structure comprising two laterally spaced mounting members,
   b. a shaft having a longitudinal axis, first and second end portions, and a middle portion, the end portions of the shaft being adapted to be mounted to said mounting members,
   c. first and second locating members, each comprising a main mounting portion, adapted to be mounted to and positioned around said shaft, and an end spacing portion,
   d. first and second bearing members, adapted to take primarily radial loads, and being adapted to be positioned adjacent to and axially inwardly from, the end spacing portions of the first and second locating members, respectively, and positioned around and supported from the main mounting portions of the locating members,
   e. a roller member adapted to be positioned around said shaft and bearing members, and supported by said bearing members,
   f. said assembly being characterized in that in an assembled position said roller member is in operative engagement with said spacing portions and in direct load bearing relationship with said bearing members in a manner that while radial loads are transmitted from said roller member into said bearing members, axial loads on said roller member are transmitted into said locating members and to said mounting structure;
   g. the main mounting portions of the locating members having axially inwardly located end portions which engage one another so as to locate said locating members relative to one another on said shaft.

2. The assembly as recited in claim 1, wherein end portions of the said roller member are directly connected to the spacing portion of the locating members, and said spacing portions are adapted to be in engagement with said mounting structure.

3. The assembly as recited in claim 1, wherein said bearing members each have inner and outer bearing races, and the spacing portions engage axially outward portions of the inner races so as to locate said inner races, and the mounting portions of the locating members have locating means to engage axially inward portions of the inner races.

4. The assembly as recited in claim 1, wherein said roller member has inwardly protruding longitudinally extending reinforcing ribs which extend along said longitudinal axis, and said bearings each have inner and outer races, said reinforcing ribs, in addition to serving a reinforcing function relative to said roller, being arranged to engage and locate the outer races.

5. The assembly as recited in claim 4, wherein said roller member has end retaining portions adapted to engage axially outward portions of said outer races so as to locate said outer races.

6. The assembly as recited in claim 1, wherein
   a. said bearing members each have inner and outer bearing races, and the spacing portions engage axially outward portions of the inner races so as to locate said races, and the mounting portions of the locating members have locating means to engage axially inward portions of the inner races, b. said roller member has inwardly protruding longitudinally extending reinforcing ribs which extend along said horizontal axis, said reinforcing ribs, in addition to serving a reinforcing function relative to said roller, being arranged to engage and locate the outer races, c. said roller member has end retaining portions adapted to engage axially outward portions of said outer races so as to locate said outer races.

7. The assembly as recited in claim 1, wherein a. end portions of the said roller member are directly connected to the spacing portion of the locating members, and said spacing portions are adapted to be in engagement with said mounting structure, b. said bearing members each have inner and outer bearing races, and the spacing portions engage axially outward portions of the inner races so as to locate said races, and the mounting portions of the locating members have locating means to engage axially inward portions of the inner races, c. said roller member has inwardly protruding longitudinally extending reinforcing ribs which extend along said horizontal axis, said reinforcing ribs, in addition to serving a reinforcing function relative to said roller, being arranged to engage and locate the outer races, d. said roller member has end retaining portions adapted to engage axially outward portions of said outer races so as to locate said outer races.

8. A roller assembly comprising:

a. a mounting structure comprising two laterally spaced mounting members, b. a shaft having a longitudinal axis, first and second end portions, and a middle portion, the end portions of the shaft being adapted to be mounted to said mounting members.

c. first and second locating members, each comprising a main mounting portion, adapted to be mounted to and positioned around said shaft, and an end spacing portion, d. first and second bearing members, adapted to take primarily radial loads, and being adapted to be positioned adjacent to and axially inwardly from, the end spacing portions of the first and second locating members, respectively, and positioned around and supported from the main mounting portions of the locating members, e. said mounting members firmly engaging said locating members to press said locating members against one another.

9. The assembly as recited in claim 8, wherein said bearing members each have inner and outer bearing races, spacing portions engage axially outward portions of the inner races so as to locate said inner races, and the mounting portions of the locating members have locating means to engage axially inward portions of the inner races.

10. The assembly as recited in claim 8, wherein said roller member has inwardly protruding longitudinally extending reinforcing ribs which extend along said longitudinal axis, and said bearings each have inner and outer races, said reinforcing ribs, in addition to serving a reinforcing function relative to said roller, being arranged to engage and locate the outer races.

11. The assembly as recited in claim 10, wherein said roller member has end retaining portions adapted to engage axially outward portions of said outer races so as to locate said outer races.

12. The assembly as recited in claim 8, wherein a. said bearing members each have inner and outer bearing races, and the spacing portions engage axially outward portions of the inner races so as to locate said races, and the mounting portions of the locating members have locating means to engage axially inward portions of the inner races, b. said roller member has inwardly protruding longitudinally extending reinforcing ribs which extend along said horizontal axis, said reinforcing ribs, in addition to serving a reinforcing function relative to said roller, being arranged to engage and locate the outer races, c. said roller member has end retaining portions adapted to engage axially outward portions of said outer races so as to locate said outer races.

13. A roller unit adapted to be mounted to a mounting structure comprising two laterally spaced mounting members, said unit comprising:

a. a shaft having a longitudinal axis, first and second end portions, and a middle portion, the end portions of the shaft being adapted to be mounted to said mounting members, b. first and second locating members, each comprising a main mounting portion, adapted to be mounted to and positioned around said shaft, and an end spacing portion, c. first and second bearing members, adapted to take primarily radial loads, and being adapted to be positioned adjacent to and axially inwardly from, the end spacing portions of the first and second locating members, respectively, and positioned around and supported from the main mounting portions of the locating members, d. a roller member adapted to be positioned around said shaft and bearing members, and supported by said bearing members, e. said unit being characterized in that in an assembled position said roller member is in operative engagement with said spacing portions and in direct load bearing relationship with said bearing members in a manner that while radial loads are transmitted from said roller member into said bearing members, axial loads on said roller member are transmitted into said locating members;

f. The main mounting portions of the locating members having axially inwardly located end portions which engage on another so as to locate said locating members relative to one another on said shaft.

14. The assembly as recited in claim 13, wherein end portions of the said roller member are directly connected to the spacing portion of the locating members, and said spacing portions are adapted to be in engagement with said mounting structure.

15. The assembly as recited in claim 13, wherein said bearing members each have inner and outer bearing races, and the spacing portions engage axially outward portions of the inner races so as to locate said inner races, and the mounting portions of the locating members have locating means to engage axially inward portions of the inner races.

16. The assembly as recited in claim 13, wherein said roller member has inwardly protruding longitudinally extending reinforcing ribs which extend along said longitudinal axis, and said bearings each have inner and outer races, said reinforcing ribs, in addition to serving a reinforcing function relative to said roller, being arranged to engage and locate the outer races.

17. The assembly as recited in claim 16, wherein said roller member has end retaining portions adapted to engage axially outward portions of said outer races so as to locate said outer races.

18. The unit as recited in claim 13, wherein
   a. said bearing members each have inner and outer bearing races, and the spacing portions engage axially outward portions of the inner races so as to locate said races, and the mounting portions of the locating members have locating means to engage axially inward portions of the inner races,
   b. said roller member has inwardly protruding longitudinally extending reinforcing ribs which extend along said horizontal axis, said reinforcing ribs, in addition to serving a reinforcing function relative to said roller, being arranged to engage and locate the outer races,
   c. said roller member has end retaining portions adapted to engage axially outward portions of said outer races so as to locate said outer races.

19. The assembly as recited in claim 18, wherein
   a. end portions of the said roller member are directly connected to the spacing portion of the locating members, and said spacing portions are adapted to be in engagement with said mounting structure,
   b. said bearing members each have inner and outer bearing races, and the spacing portions engage axially outward portions of the inner races so as to locate said races, and the mounting portions of the locating members have locating means to engage axially inward portions of the inner races,
   c. said roller member has inwardly protruding longitudinally extending reinforcing ribs which extend along said horizontal axis, said reinforcing ribs, in addition to serving a reinforcing function relative to said roller, being arranged to engage and locate the outer races,
   d. said roller member has end retaining portions adapted to engage axially outward portions of said outer races so as to locate said outer races.

* * * * *